(12) United States Patent
Lei (10) Patent No.: US 11,648,505 B2
(45) Date of Patent: May 16, 2023

(54) PORTABLE OXYGEN CONCENTRATOR

(71) Applicant: ANHUI XIAOSHAN MEDICAL TECHNOLOGY CO., LTD., Xuancheng (CN)

(72) Inventor: Ji Lei, Guangzhou (CN)

(73) Assignee: ANHUI XIAOSHAN MEDICAL TECHNOLOGY CO., LTD., Xuancheng (CN)

( * ) Notice: Subject to any disclaimer, the term of this patent is extended or adjusted under 35 U.S.C. 154(b) by 0 days.

(21) Appl. No.: 17/921,641

(22) PCT Filed: May 7, 2020

(86) PCT No.: PCT/CN2020/088981
§ 371 (c)(1),
(2) Date: Oct. 27, 2022

(87) PCT Pub. No.: WO2021/223155
PCT Pub. Date: Nov. 11, 2021

(65) Prior Publication Data
US 2023/0120614 A1 Apr. 20, 2023

(51) Int. Cl.
*B01D 53/047* (2006.01)
*B01D 53/053* (2006.01)
*C01B 13/02* (2006.01)
*B01D 53/04* (2006.01)

(52) U.S. Cl.
CPC ....... *B01D 53/053* (2013.01); *B01D 53/0446* (2013.01); *C01B 13/0274* (2013.01);
(Continued)

(58) Field of Classification Search
CPC .... B01D 53/04; B01D 53/047; B01D 53/053; B01D 53/0446; B01D 2253/116;
(Continued)

(56) References Cited

U.S. PATENT DOCUMENTS 4,636,226 A * 1/1987 Canfora ................. B01D 53/04
95/138
5,222,491 A 6/1993 Thomas
(Continued)

FOREIGN PATENT DOCUMENTS

| CN | 102372263 A | 3/2012 |
| CN | 204569418 U | 8/2015 |
| CN | 204873827 U | 12/2015 |
| CN | 204897398 U | 12/2015 |
| CN | 107670152 A | 2/2018 |

(Continued)

*Primary Examiner* — Frank M Lawrence, Jr.
(74) *Attorney, Agent, or Firm* — Bayramoglu Law Offices LLC (57) ABSTRACT

A portable oxygen concentrator includes at least one separation mechanism and an oxygen storage tank, where the separation mechanism is connected to the oxygen storage tank and includes an air bag and a molecular sieve tank that is filled with a molecular sieve for adsorption. The air bag has an air inlet and an air outlet. The air bag is connected to the molecular sieve tank through a valve group, which includes a first single valve and a second single valve. The air bag is connected to the molecular sieve tank through the first single valve. Each of the two ends of the molecular sieve tank has at least one gas outlet. When an inner space of the air bag is compressed and expanded once, the molecular sieve in the molecular sieve tank adsorbs and desorbs once.

13 Claims, 3 Drawing Sheets

(52) U.S. Cl.
CPC .... *B01D 2253/116* (2013.01); *B01D 2256/12* (2013.01); *B01D 2257/102* (2013.01); *B01D 2259/401* (2013.01); *B01D 2259/4533* (2013.01); *B01D 2259/4541* (2013.01); *C01B 2210/002* (2013.01)

(58) Field of Classification Search
CPC .......... B01D 2256/12; B01D 2257/102; B01D 2259/401; B01D 2259/4533; B01D 2259/4541; C01B 13/074; C01B 2210/002
USPC ....................... 95/130; 96/121, 130, 143, 144
See application file for complete search history.

(56) References Cited

U.S. PATENT DOCUMENTS

| | | | | |
|---|---|---|---|---|
| 2004/0050255 A1* | 3/2004 | Simonds | ............ | B01D 53/0415 96/109 |
| 2015/0083121 A1* | 3/2015 | Fisher | ............... | A61M 16/0057 128/205.13 |
| 2020/0155785 A1* | 5/2020 | Koerber | .............. | A61M 16/105 |

FOREIGN PATENT DOCUMENTS

| | | |
|---|---|---|
| CN | 207209955 U | 4/2018 |
| CN | 207738452 U | 8/2018 |
| CN | 208603714 U | 3/2019 |
| CN | 109613859 A | 4/2019 |
| CN | 110104614 A | 8/2019 |
| WO | 9637176 A1 | 11/1996 |

\* cited by examiner

PORTABLE OXYGEN CONCENTRATOR

CROSS-REFERENCE TO RELATED APPLICATION

The application is the national phase entry of International Application No. PCT/CN2020/088981, filed on May 7, 2022, the entire contents of which are incorporated herein by reference.

TECHNICAL FIELD

The present disclosure relates to a gas separation device and more particularly to an oxygen concentrator.

BACKGROUND

Pressure swing adsorption (PSA) is a gas separation technique. Since PSA came out, it has attracted the attention of global industrial circles and has developed rapidly through vigorous research. PSA is based on the following principle: according to different adsorption properties of different gas molecules, an adsorbent molecular sieve is used to separate the gas mixture; and after the adsorption equilibrium, according to different adsorption amounts of the different gas molecules under different pressures, the molecular sieve reduces the pressure to desorb the adsorbed gas, which is referred to as a regeneration process. At present, PSA devices usually use two or more towers connected in parallel to alternately perform pressurized adsorption and depressurized regeneration, so as to obtain continuous gas products.

The PSA-based oxygen concentrator generally adopts pressurized adsorption and normal-pressure desorption, and the same cyclic process is carried out by two adsorption towers to realize a continuous gas supply. The whole system is automatically controlled by a single-chip microcomputer (SCM).

At present, most of the oxygen concentrators on the market use this technology. The air is compressed by an oil-free compressor and then delivered into the molecular sieve tank through a pipe to separate the air using the molecular sieve.

For example, the Chinese patent application 201710983403.6 provides an intelligent oxygen concentrator. The intelligent oxygen concentrator includes a main control board, a blood oxygen detection module, and an oil-free compressor. The blood oxygen detection module and the oil-free compressor are connected to the main control board. The blood oxygen detection module is configured to detect a blood oxygen concentration of a target user, generate an electrical signal corresponding to the detected blood oxygen concentration, and send the electrical signal to the main control board. The main control board is configured to generate a speed adjustment signal corresponding to the electrical signal. The oil-free compressor is configured to adjust the motor speed according to the speed adjustment signal. Since the oil-free compressor usually runs at a speed greater than 1,000 rpm, it produces intense heat and loud noise during operation.

At present, noise is typically reduced by improving the machining accuracy of the compressor or miniaturizing the compressor. For example, the Chinese patent application 201910454114.6 provides a portable oxygen concentrator. The portable oxygen concentrator includes a plastic casing, a tube, a noise-absorbing air filter, and a micro-compressor that are embedded inside the plastic casing and arranged in sequence along the tube, and a molecular sieve tower integrated with a solenoid valve. However, in this patent, every oxygen concentrator with a corresponding compressor displacement requires a certain amount of air in each working cycle. Therefore, when the compressor is miniaturized, it is necessary to increase the speed to meet the air amount demand. In addition, the miniaturization process increases processing requirements and costs.

Besides, noise is also reduced by using a muffler cover. For example, the Chinese patent application 201820097714.2 provides a muffler cover for an oxygen concentrator. The muffler cover includes a cover plate, a fixed rod, an activated carbon filter plate, an air inlet pipe, a cover body, support legs, an air outlet pipe, a cylinder, a sound insulation board, a pressure plate, an oxygen concentrator body, and a pressure rod. The cover plate is fixed on the upper end of the cover body. There are four support legs, which are symmetrically fixed on the lower end surface of the cover body. The sound insulation board is fixed to the inner wall of the cover body. The oxygen concentrator body is fixed inside the cover body and is located at the inner end of the sound insulation board. The cylinder is fixed to the inner top end of the cover plate. The pressure rod is fixed at the lower end of the cylinder. The lower end of the pressure rod passes through the cover plate, the cover body, and the sound insulation board and extends to an inner layer of the sound insulation board. The pressure plate is fixed to the lower end of the pressure rod. The air inlet pipe is fixed to the left end of the oxygen concentrator body. The left end of the air inlet pipe passes through the sound insulation board and the cover body in sequence and extends to the left side of the cover body. The fixed rod is fixed to the left end of the cover body. The activated carbon filter plate is fixed to the left end of the fixed rod. The air outlet pipe is fixed to the right end of the oxygen concentrator. The right end of the air outlet pipe passes through the sound insulation board and the cover body in sequence and extends to the right side of the cover body.

The high-speed dry friction between the metal cylinder body and the piston of the oil-free compressor generates enormous amounts of heat. In addition, gas compression is an exothermic process, and the motor of the compressor also generates heat. Some oxygen concentrators on the market have taken heat dissipation measures, but their internal working temperature remains 80° C. to 90° C. or more, which seriously affects the adsorption performance and efficiency of the molecular sieve. Electronic circuits are sensitive to high temperatures and are prone to system failures under high temperatures. To solve the heating problem of the oxygen concentrator, it is necessary to provide openings in the system to dissipate the heat through the cooling fan and the air duct, but the openings also facilitate the transfer of noise. Though the oxygen concentrator optimally uses a low-noise high-precision compressor, the low-noise high-precision compressor is expensive and cannot fully eliminate noise.

The adsorption or desorption of the molecular sieve used in the existing oxygen concentrator takes several seconds, and the molecular sieve usually works at a frequency of less than 10 times per minute. The oil-free compressor has a higher speed, and its working process is thus asynchronous to that of the molecular sieve. Therefore, it is necessary to use the electronic sensor, SCM, multi-way solenoid valves, and a complex control circuit to match the working process of the molecular sieve.

For example, the Chinese patent application 201520585327.X provides a PSA-based oxygen concentrator. The PSA-based oxygen concentrator includes a control module, an oxygen production process monitoring module, a human-machine interface module, and a power supply module. The control module includes an SCM and an electrically erasable programmable read-only memory (EEPROM) watchdog circuit connected to the SCM. The oxygen production process monitoring module includes a compressor and a molecular sieve adsorption tower. The compressor is connected to the molecular sieve adsorption tower through a solenoid valve. The power supply end of the compressor and the control end of the solenoid valve are connected to the SCM. The gas outlet of the molecular sieve adsorption tower is provided with an oxygen concentration sensor, which is connected to the SCM.

To sum up, existing miniature oxygen concentrators have the following defects: many parts, a complex structure, a high heat generation rate, loud noise, and a high cost (requires special heat dissipation and denoising designs and a complex control circuit). The oxygen concentrators are mostly used by patients, who need a quiet environment. In addition, the existing oxygen concentrators cannot work without power, and thus, cannot meet the need for some power-off occasions, especially portable use in outdoor occasions.

The information disclosed in the Background section is merely intended to facilitate understanding of the general background of the present disclosure and should not be taken as an acknowledgment or any form of suggestion that this information forms the prior art already known to those of ordinary skill in the art.

SUMMARY

The present disclosure aims to solve the technical problem that the oxygen concentrator in the prior art has a high heat generation rate, loud noise, many parts, complex structure, high cost, and is not suitable for portable use.

The present disclosure solves the above technical problem through the following technical solution.

A portable oxygen concentrator includes at least one separation mechanism, where the separation mechanism includes an air bag having a compressible and expandable inner space and a molecular sieve tank filled with a molecular sieve for adsorption. The air bag has an air inlet and an air outlet; the air inlet of the air bag is provided with a one-way valve. The air bag is connected to the molecular sieve tank through a valve group, which includes a first single valve and a second single valve. The first single valve is a one-way pressure valve, and the second single valve is a normally-open valve. The air outlet of the air bag is connected to the molecular sieve tank through the first single valve. Each of the two ends of the molecular sieve tank has at least one gas outlet for discharging a separated gas. The gas outlet at one end of the molecular sieve tank connected to the air bag is provided with the second single valve which is linked with the first single valve. When the first single valve is opened and closed, the second single valve is closed and opened under linkage.

The inner space of the air bag is compressed and expanded once to form a working cycle, and the molecular sieve in the molecular sieve tank adsorbs and desorbs once to form a working cycle. During a compression process of the inner space of the air bag, when the pressure in the air bag increases to a set pressure value, the first single valve is opened, the second single valve is closed, and the molecular sieve in the molecular sieve tank starts an adsorption process. During an expansion process of the inner space of the air bag, the first single valve is closed, the second single valve is opened, and the molecular sieve in the molecular sieve tank starts a desorption process.

The present disclosure replaces the oil-free compressor used by most oxygen concentrators with the air bag and maintains the working process of the air bag by synchronizing with the molecular sieve in a linkage manner through the valve group. When the air bag is compressed to increase its internal gas pressure to the set value, the first single valve is opened and the second single valve is closed, thereby filling the molecular sieve tank with high-pressure air (mainly a mixture of nitrogen and oxygen). The internal pressure of the molecular sieve tank increases, and the molecular sieve adsorbs the mixed gas and separates and discharges oxygen. When the air bag is expanded, the first single valve is closed and the second single valve is opened. The pressure in the molecular sieve tank is reduced, and the molecular sieve desorbs and discharges the remaining nitrogen.

Preferably, there are two separation mechanisms. The air bags of the two separation mechanisms are connected and sandwiched together with a movable pressure plate. When the inner space of one air bag is expanded or compressed, the inner space of the other air bag is compressed or expanded.

The present disclosure uses at least two separation mechanisms that cooperate to generate oxygen, thereby affording high efficiency.

Preferably, a throttle valve is provided between the molecular sieve tank and the oxygen storage tank. During the adsorption process of the molecular sieve in the molecular sieve tank, the throttle valve controls the oxygen output flow to avoid the discharge of nitrogen. During the desorption process of the molecular sieve, as the pressure in the molecular sieve tank is gradually reduced, part of the oxygen in the oxygen storage tank is blown back through the throttle valve, which facilitates the regeneration of the adsorption capacity of the molecular sieve.

Preferably, the valve group is formed by a two-position two-way linked one-way pressure valve, which includes the first single valve and the second single valve. The first single valve and the second single valve are linked by a sliding vane. The mechanical linkage further reduces the components used in the linkage of the electronic circuit.

Preferably, the oxygen concentrator further includes an oxygen storage tank connected to the separation mechanism.

Preferably, the oxygen concentrator further includes a humidifier connected to the oxygen storage tank. An oxygen storage tank throttle valve is provided between the humidifier and the oxygen storage tank. The oxygen storage tank throttle valve is an adjustable throttle valve for users to adjust the oxygen demand according to their needs.

Preferably, the air bag is a folding air bag or an elastic air bag. The pressure plate can be manually moved to realize the power-off use and features a simple structure, easy material acquisition, and lightweight design.

Preferably, the pressure plate is provided with a permanent magnet, and one end of each of the two air bags positioned away from the pressure plate has an electromagnet structure that attracts or repels the pressure plate.

The present disclosure has the following advantages. The present disclosure replaces the oil-free compressor used by most oxygen concentrators with the air bag and maintains the working process of the air bag by synchronizing with that of the molecular sieve in a linkage manner through the valve group. There is no need for oil lubrication inside the air bag, and it will not pollute the gas passage and the molecular sieve. In addition, like the oil-free compressor, the air bag can provide a clean air source suitable for human breathing. Since the optimal working frequency of the molecular sieve is usually less than 10 times per minute, the synchronous movement speed of the air bag is low, and no special heat dissipation and noise reduction design is required, which solves the problem of noise and heat generation from the source. The design also eliminates the use of the electronic sensor, a single-chip microcomputer (SCM), a multi-way solenoid valve, and a complex control circuit in the traditional device. The compression and expansion of the inner space of the air bag can be realized manually, such that the power-off work can be realized under special conditions. The air bag can be folded when not working, and the volume is small. The air bag is made of a non-metallic material and is light in weight. The air bag has few parts and components, a simple structure, and low cost, and does not require a finish. Therefore, the present disclosure is suitable for vehicle-mounted, portable, field survival, emergency rescue, emergency equipment, and low-cost, low-noise occasions.

Reference Numerals: 1. air bag; 11. one-way valve; 2. molecular sieve tank; 21. throttle valve; 3. two-position two-way linked one-way pressure valve; 4. oxygen storage tank; 41. oxygen storage tank throttle valve; 5. humidifier; and 6. pressure plate; and

1'. first air bag; 1". second air bag; 11'. first one-way valve; 11". second one-way valve; 2'. first molecular sieve tank; 2". second molecular sieve tank; 21'. first throttle valve; 21". second throttle valve; 3'. first two-position two-way linked one-way pressure valve; and 3". second two-position two-way linked one-way pressure valve.

DETAILED DESCRIPTION OF THE EMBODIMENTS

To make the objectives, technical solutions, and advantages of embodiments of the present disclosure clearer, the following clearly and completely describes the technical solutions in the embodiments of the present disclosure with reference to the embodiments of the present disclosure. The described embodiments are some, rather than all, of the embodiments. All other embodiments obtained by those of ordinary skill in the art based on the embodiments of the present disclosure without creative efforts shall fall within the protection scope of the present disclosure.

Embodiment 1

Figure 1:
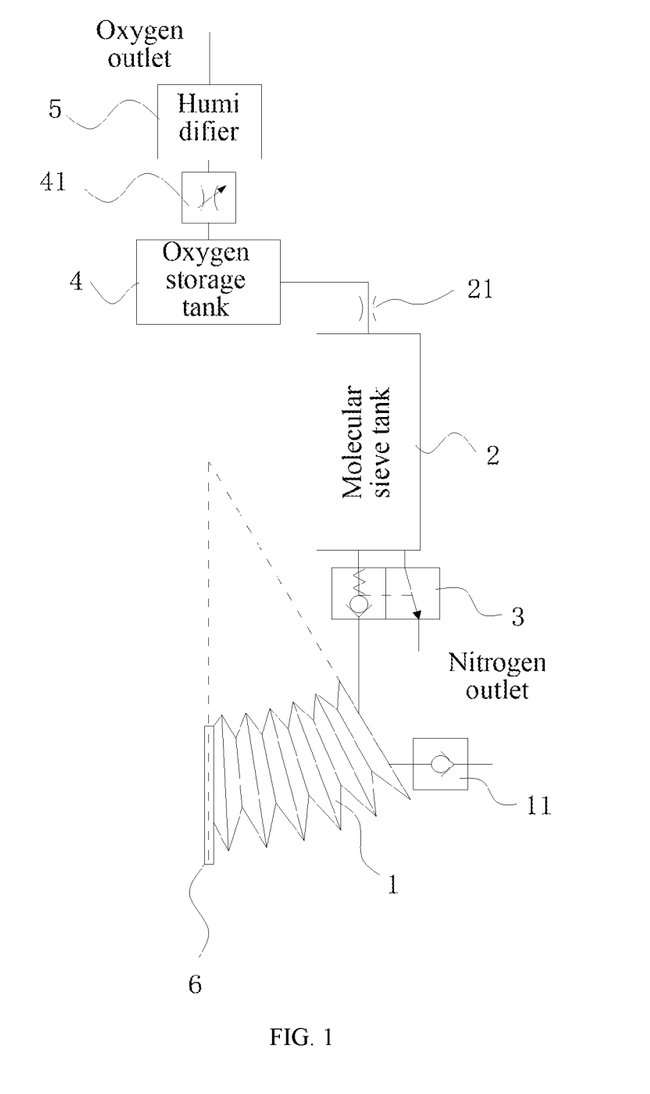
FIG. 1 is a structural view of a portable oxygen concentrator according to Embodiment 1 of the present disclosure.

As shown in FIG. 1, a portable oxygen concentrator includes a separation mechanism and oxygen storage tank 4. The separation mechanism includes air bag 1 and molecular sieve tank 2. The molecular sieve tank 2 is filled with a molecular sieve for adsorption and is connected to the oxygen storage tank 4.

The air bag 1 has a compressible and expandable inner space. The air bag 1 has an air inlet and an air outlet. The air inlet is provided with one-way valve 11. The air bag 1 is connected to the molecular sieve tank 2 through a valve group. The valve group includes a first single valve and a second single valve that are linked. The first single valve is a one-way pressure valve, and the second single valve is a normally-open valve. The air outlet of the air bag 1 is connected to the bottom of the molecular sieve tank 2 through the first single valve. Two ends of the molecular sieve tank 2 each have at least one gas outlet for discharging a separated gas. Among the gas outlets, one gas outlet is located at the bottom of the molecular sieve tank to discharge nitrogen. The second single valve is provided at the nitrogen outlet. When the first single valve is open, the second single valve is closed. When the first single valve is closed, the second single valve is open. The other gas outlet of the molecular sieve tank 2 is located at the top of the molecular sieve tank to discharge oxygen. The oxygen outlet is connected to the oxygen storage tank 4. Throttle valve 21 is provided between the oxygen storage tank 4 and the molecular sieve tank 2.

The throttle valve 21 is a common throttle valve and its parameters are set during design. During an adsorption process, oxygen is discharged from the top of the molecular sieve tank 2, and the throttle valve 21 restricts an oxygen output flow. When the nitrogen outlet at the bottom of the molecular sieve tank 2 is opened and a desorption process begins, a nitrogen-oxygen mixed layer in the molecular sieve tank 2 is controlled such that there is a certain distance between the nitrogen-oxygen mixed layer and the top of the molecular sieve tank 2. In this way, all that is discharged from the top of the molecular sieve tank 2 is oxygen. As the gas pressure in the molecular sieve tank 2 is reduced, part of the oxygen in the oxygen storage tank 4 returns to the molecular sieve tank 2 through the throttle valve 21, which facilitates the regeneration of the adsorption capacity of the molecular sieve. The throttle valve 21 may also include two one-way throttle valves, one for controlling the oxygen output flow of the molecular sieve tank 2, and the other for controlling the oxygen blowback flow of the oxygen storage tank 4.

Figure 2:
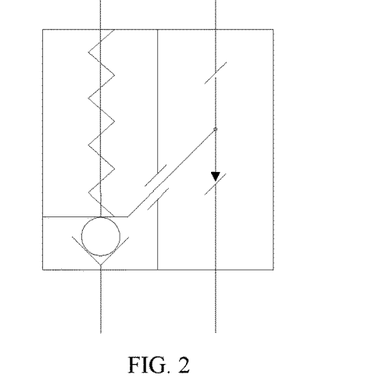
FIG. 2 is a structural view of a two-position two-way linked one-way pressure valve.

In this embodiment, the valve group may directly use a two-position two-way linked one-way pressure valve 3. As shown in FIG. 2, the first single valve is located on the left side of the two-position two-way linked one-way pressure valve 3, and the second single valve is located on the right side of the two-position two-way linked one-way pressure valve 3. The first single valve and the second single valve are linked by a sliding vane. Specifically, the left gas passage is normally closed, and the right gas passage is normally open. When the gas pressure of the left gas inlet is greater than a set value, the left gas passage is opened, and the sliding vane is driven to move up, causing the right gas passage to be closed. When the gas pressure of the left gas inlet is less than the set value, the left gas passage is closed, and the sliding vane is driven to move down, causing the right gas passage to be opened.

It should be noted that the first single valve is a one-way pressure valve, and the second single valve is a normally-open valve, and their operation can be linked using electromagnetic signals, etc., to make one open and the other closed.

In this embodiment, the air bag 1 is a folding air bag or an elastic air bag. The inner space of the air bag can be changed by squeezing or stretching. Specifically, the air bag has one end fixed and the other end provided with pressure plate 6. The pressure plate 6 moves back and forth to realize the compression and expansion of the inner space of the air bag.

In this embodiment, the oxygen concentrator further includes humidifier 5. The oxygen storage tank 4 is connected to the humidifier 5. Oxygen storage tank throttle valve 41 is provided between the humidifier 5 and the oxygen storage tank 4. The oxygen storage tank throttle valve 41 is an adjustable flow valve. The user can adjust the oxygen output flow by adjusting the oxygen storage tank throttle valve.

The specific working process of this embodiment is as follows: When the air bag 1 is compressed from a maximum expansion state, the gas pressure in the air bag 1 increases. The one-way valve 11 is closed, and the gas pressure in the air bag 1 gradually increases. When the pressure increases to the pressure value set by the two-position two-way linked one-way pressure valve 3, the left gas passage of the two-position two-way linked one-way pressure valve 3 is opened, and the right gas passage is closed. The high-pressure air enters the molecular sieve tank 2 through the left gas passage, and the molecular sieve in the molecular sieve tank 2 starts the adsorption process. Due to the adsorption effect of the molecular sieve, nitrogen is adsorbed by the molecular sieve, and oxygen is forced to reach the top of the molecular sieve tank 2 and enters the oxygen storage tank 4 through the throttle valve 21.

When the air bag 1 is expanded from a maximum compression state, an air source is sucked into the air bag 1 through the one-way valve 11 from the air inlet. The left gas passage of the two-position two-way linked one-way pressure valve 3 is closed, and the right gas passage is opened. The nitrogen in the molecular sieve tank 2 is discharged from the right gas passage, and the molecular sieve in the molecular sieve tank 2 starts the desorption process. As the pressure in the molecular sieve tank 2 is gradually reduced, part of the oxygen in the oxygen storage tank 4 flows back to the molecular sieve tank 2 through the throttle valve 21, which facilitates the regeneration of the adsorption capacity of the molecular sieve. When the inner space of the air bag 1 is expanded to the maximum, a maximum amount of air is sucked.

So far, the air bag 1 realizes one working cycle of compression and expansion, and the molecular sieve in the molecular sieve tank 2 realizes one working cycle of adsorption and desorption.

This embodiment replaces the oil-free compressor in the prior art with the air bag 1. The high-pressure air is charged into the molecular sieve tank 2, the molecular sieve in the molecular sieve tank 2 adsorbs nitrogen, and the required oxygen is stored in the oxygen storage tank 4. After depressurized desorption, the remaining nitrogen is discharged. Since the compressor is omitted, noise reduction and heat dissipation-related designs are not required. Therefore, the present embodiment achieves low noise, low heat generation, and a simple structure. The compression and expansion of the inner space of the air bag 1 are synchronized with the adsorption and desorption of the molecular sieve in the molecular sieve tank 2 to keep the working process of the air bag 1 synchronized with that of the molecular sieve. The design eliminates the use of the electronic sensor, SCM, multi-way solenoid valve, and complex control circuit in the traditional device and realizes the manual compression and expansion of the inner space of the air bag 1 for the power-off operation.

This embodiment is adaptable, small in size, lightweight, and portable and can be applied to various occasions, such as field survival, emergency rescue, emergency equipment, and home use.

Embodiment 2

Figure 3:
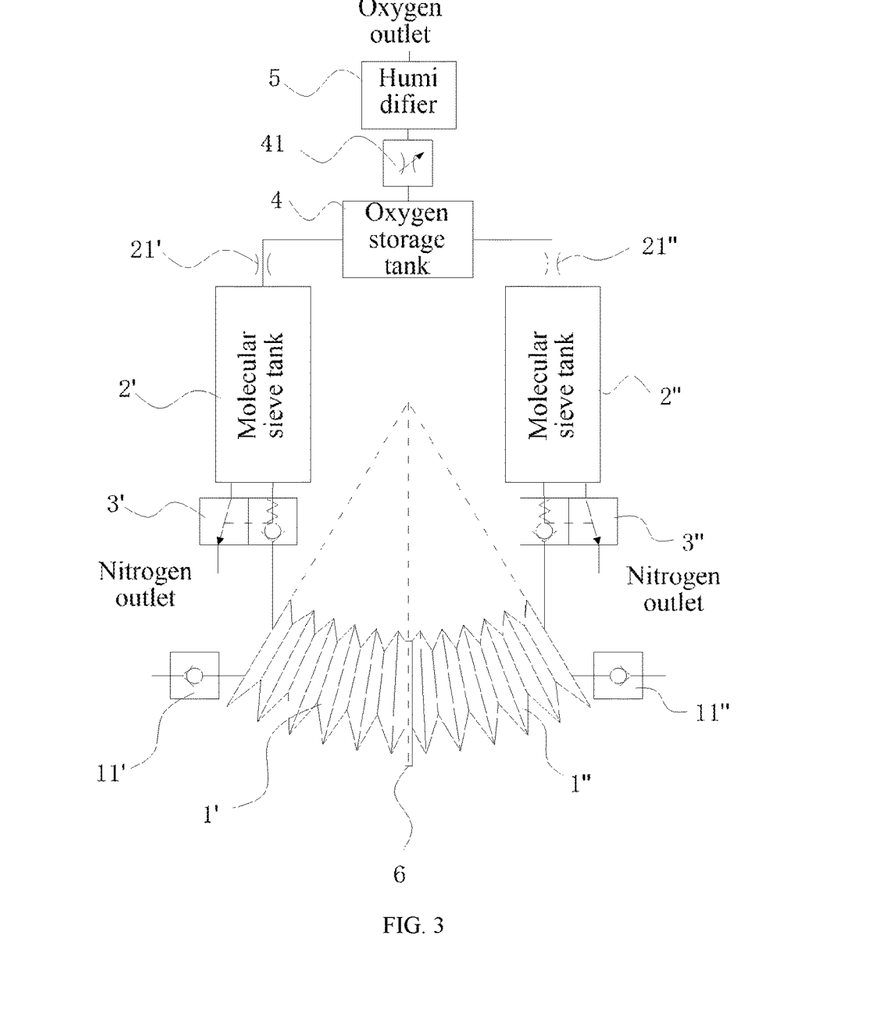
FIG. 3 is a structural view of a portable oxygen concentrator according to Embodiment 2 of the present disclosure.

As shown in FIG. 3, in this embodiment, on the basis of Embodiment 1, the portable oxygen concentrator further includes a separation mechanism. The two separation mechanisms share the oxygen storage tank 4, the oxygen storage tank throttle valve 41, and the humidifier 5.

As shown in FIG. 3, the left air bag is first air bag 1', and the right air bag is second air bag 1". The left one-way valve is first one-way valve 11', and the right one-way valve is second one-way valve 11". The left molecular sieve tank is first molecular sieve tank 2', and the right molecular sieve tank is second molecular sieve tank 2". The left throttle valve is first throttle valve 21', and the right throttle valve is second throttle valve 21". The left two-position two-way linked one-way pressure valve is first two-position two-way linked one-way pressure valve 3', and the right two-position two-way linked one-way pressure valve is second two-position two-way linked one-way pressure valve 3".

The movable pressure plate 6 is provided between the first air bag 1' and the second air bag 1". When the inner space of the first air bag 1' is expanded, the inner space of the second air bag 1" is compressed, and vice versa.

The air inlet of the first air bag 1' is provided with the first one-way valve 11'. The air outlet of the first air bag 1' is connected to the first molecular sieve tank 2' through the first two-position two-way linked one-way pressure valve 3'. The top of the first molecular sieve tank 2' is connected to the left end of the oxygen storage tank 4. The first throttle valve 21' is provided between the first molecular sieve tank 2' and the oxygen storage tank 4. The air inlet of the second air bag 1" is provided with the second one-way valve 11". The air outlet of the second air bag 1" is connected to the second molecular sieve tank 2" through the second two-position two-way linked one-way pressure valve 3". The top of the second molecular sieve tank 2" is connected to the right end of the oxygen storage tank 4. The second throttle valve 21" is provided between the second molecular sieve tank 2" and the oxygen storage tank 4.

Figure 4:
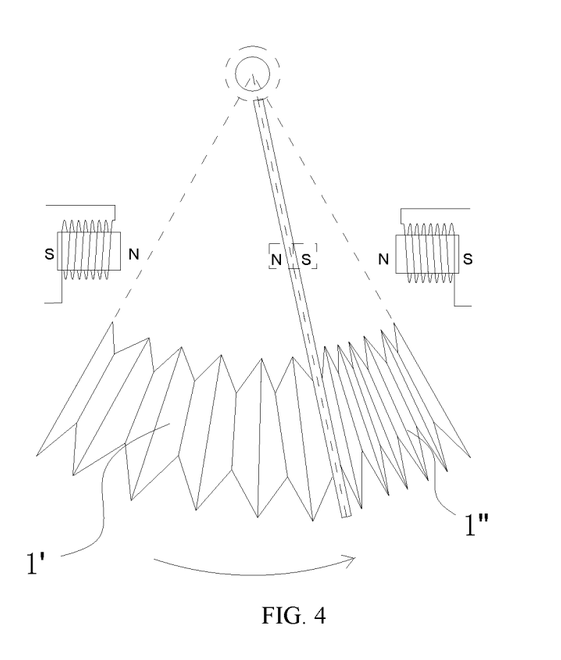
FIG. 4 is a schematic view of a pressure plate moving to the right according to Embodiment 3 of the present disclosure.

The specific working process of this embodiment is as follows: As shown in FIG. 4, when the pressure plate 6 swings to the right, the inner space of the first air bag 1' increases continuously, and the air source is sucked into the first air bag 1' through the first one-way valve 11' of the left air inlet. The inner space of the second air bag 1" is compressed to increase its internal gas pressure, and the second one-way valve 11" is closed. When the pressure in the air bag increases to the pressure value set by the second two-position two-way linked one-way pressure valve 3", the left gas passage of the second two-position two-way linked one-way pressure valve 3" is opened, and the right gas passage is closed. The high-pressure air enters the second molecular sieve tank 2" through the second two-position two-way linked one-way pressure valve 3", and the molecular sieve in the second molecular sieve tank 2" starts the adsorption process. Due to the adsorption effect of the molecular sieve, nitrogen is adsorbed by the molecular sieve, and oxygen is forced to reach the top of the second molecular sieve tank 2" and enter the oxygen storage tank 4 through the second throttle valve 21". Part of the oxygen flows from the oxygen storage tank 4 to the oxygen outlet via the humidifier 5 through the oxygen storage tank throttle valve 41.

When the pressure plate 6 swings to the rightmost end, the inner space of the first air bag 1' is expanded to the maximum and sucks the maximum amount of air so the inner space of the second air bag 1" is compressed to the minimum.

Figure 5:
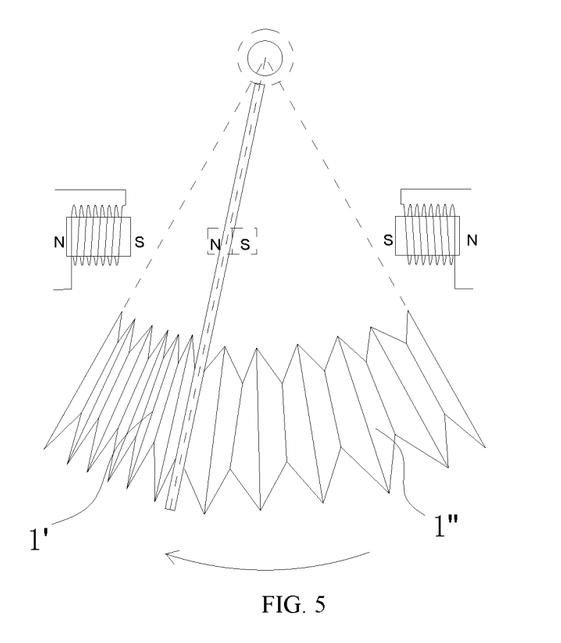
FIG. 5 is a schematic view of the pressure plate moving to the left according to Embodiment 3 of the present disclosure.

As shown in FIG. 5, when the pressure plate 6 swings from right to left, the inner space of the second air bag 1" is expanded. The gas pressure in the second air bag is reduced, and the second one-way valve 11" is opened. The second air bag 1" sucks air from the air inlet. The left gas passage of the second two-position two-way linked one-way pressure valve 3" is closed, and the right gas passage is opened. The second molecular sieve tank 2" discharges nitrogen through the nitrogen outlet, and the molecular sieve in the second molecular sieve tank 2" starts the desorption process. As the pressure in the second molecular sieve tank 2" is gradually reduced, part of the oxygen in the oxygen storage tank 4 flows back through the second throttle valve 21", which facilitates the regeneration of the adsorption capacity of the molecular sieve in the second molecular sieve tank 2". The inner space of the second air bag 1' is compressed to increase the internal gas pressure, and the first one-way valve 11' is closed. When the internal pressure of the first air bag 1' increases to the pressure value set by the first two-position two-way linked one-way pressure valve 3', the right gas passage of the first two-position two-way linked one-way pressure valve 3' is opened and the left gas passage is closed. The high-pressure air enters the first molecular sieve tank 2' through the first two-position two-way linked one-way pressure valve 3', and the molecular sieve in the first molecular sieve tank 2' starts the adsorption process. Due to the adsorption effect of the molecular sieve, nitrogen is adsorbed by the molecular sieve, and oxygen is forced to reach the top of the first molecular sieve tank 2' and enter the oxygen storage tank 4 through the first throttle valve 21'.

When the pressure plate 6 swings to the leftmost end, the inner space of the second air bag 1" is expanded to the maximum and sucks the maximum amount of air so the inner space of the first air bag 1' is compressed to the minimum.

The pressure plate 6 swings back to the right, the inner space of the first air bag 1' is expanded to reduce its internal gas pressure, and the first one-way valve 11" is opened. The first air bag 1' sucks air from the air inlet. The right gas passage of the first two-position two-way linked one-way pressure valve 3' is closed and the left gas passage thereof is opened. The first molecular sieve tank 2' discharges nitrogen from the nitrogen outlet, and the molecular sieve in the first molecular sieve tank 2' starts the desorption process. Since the pressure in the first molecular sieve tank 2' is gradually reduced, part of the oxygen in the oxygen storage tank 4 flows back through the first throttle valve 21'. The inner space of the second air bag 1" is compressed to increase its internal gas pressure, and the second one-way valve 11" is closed. When the pressure in the second air bag 1" increases to the pressure value set by the second two-position two-way linked one-way pressure valve 3", the left gas passage of the second two-position two-way linked one-way pressure valve 3" is opened, and the right gas passage is closed. The high-pressure air enters the second molecular sieve tank 2" through the second two-position two-way linked one-way pressure valve 3", and the molecular sieve in the second molecular sieve tank 2" starts the adsorption process. Thus, the system starts the next working cycle.

In this embodiment, the two separation mechanisms cooperate to generate oxygen alternately, thereby realizing continuous gas supply and high efficiency.

In this embodiment, the left end of the first air bag 1' is fixed to the right end of the second air bag 1", and the inner space of the air bag can be compressed and expanded by manually operating the pressure plate 6, thereby realizing the power-off operation.

Embodiment 3

As shown in FIGS. 4 and 5, the pressure plate 6 is provided with a permanent magnet, and the left end of the first air bag 1' and the right end of the second air bag 1" are provided with electromagnet structures. By changing the direction of the current, the magnetic poles are changed, and the interaction between the electromagnet structures and the permanent magnet of the pressure plate 6 causes the compression and expansion of the inner space of the air bag. As shown in FIG. 4, the pressure plate 6 has a left side provided with an N pole and a right side provided with an S pole. The second air bag 1' has a left end provided with an N pole, and the first air bag 1' has a right end provided with an N pole. Therefore, the second air bag 1' attracts the pressure plate 6, and the first air bag 1' repels the pressure plate 6. As shown in FIG. 5, the squeeze plate 6 has a left side provided with an N pole and a right side provided with an S pole. The second air bag 1" has a left end provided with an S pole, and the first air bag 1' has a right end provided with an S pole. Therefore, the second air bag 1" repels the pressure plate 6, and the first air bag 1' attracts the pressure plate 6.

Alternatively, the left end of the first air bag 1' and the right end of the second air bag 1" are provided with a pair of repulsive permanent magnets, and the pressure plate 6 is provided with an electromagnet structure. By changing the direction of the current, the magnetic pole of the pressure plate 6 is changed to achieve left-right movement of the pressure plate 6.

The foregoing embodiments are only used to explain the technical solutions of the present disclosure and are not intended to limit the same. Although the present disclosure is described in detail with reference to the foregoing embodiments, those of ordinary skill in the art should understand that they can still modify the technical solutions described in the foregoing embodiments or make equivalent substitutions on some technical features therein. These modifications or substitutions do not make the essence of the corresponding technical solutions deviate from the spirit and scope of the technical solutions of the embodiments of the present disclosure.

What is claimed is:

1. A portable oxygen concentrator, comprising at least one separation mechanism, wherein the at least one separation mechanism comprises an air bag having an inner space, and a molecular sieve tank filled with a molecular sieve for adsorption; the inner space is compressible and expandable; the air bag has an air inlet and an air outlet; the air inlet of the air bag is provided with a one-way valve; the air bag is connected to the molecular sieve tank through a valve group; the valve group comprises a first single valve and a second single valve; the first single valve is a one-way pressure valve, and the second single valve is a normally-open valve; the air outlet of the air bag is connected to the molecular sieve tank through the first single valve; two ends of the molecular sieve tank each have at least one gas outlet for discharging a separated gas; the gas outlet at one end of the molecular sieve tank connected to the air bag is provided with the second single valve linked with the first single valve; and when the first single valve is opened and closed, the second single valve is closed and opened under linkage; and the inner space of the air bag is compressed and expanded once to form a working cycle, and the molecular sieve in the molecular sieve tank adsorbs and desorbs once to form a working cycle; during a compression process of the inner space of the air bag, when a pressure in the air bag increases to a set pressure value, the first single valve is opened, the second single valve is closed, and the molecular sieve in the molecular sieve tank starts an adsorption process; and during an expansion process of the inner space of the air bag, the first single valve is closed, the second single valve is opened, and the molecular sieve in the molecular sieve tank starts a desorption process.

2. The portable oxygen concentrator according to claim 1, wherein there are two separation mechanisms; the air bags of the two separation mechanisms are connected and sandwiched together with a movable pressure plate; and when the inner space of one air bag is expanded or compressed, the inner space of the other air bag is compressed or expanded.

3. The portable oxygen concentrator according to claim 1, wherein a throttle valve is provided between the molecular sieve tank and an oxygen storage tank.

4. The portable oxygen concentrator according to claim 1, wherein the valve group is a two-position two-way linked one-way pressure valve, the first single valve is a first-position valve of the two-position two-way linked one-way pressure valve and the second single valve is a second-position valve of the two-position two-way linked one-way pressure valve; and the first single valve and the second single valve are linked by a sliding vane.

5. The portable oxygen concentrator according to claim 1, further comprising an oxygen storage tank connected to the separation mechanism.

6. The portable oxygen concentrator according to claim 5, further comprising a humidifier connected to the oxygen storage tank, wherein an oxygen storage tank throttle valve is provided between the humidifier and the oxygen storage tank.

7. The portable oxygen concentrator according to claim 1, wherein the air bag is a folding air bag or an elastic air bag.

8. The portable oxygen concentrator according to claim 2, wherein the movable pressure plate is provided with a permanent magnet, and one end of each of the two air bags away from the movable pressure plate has an electromagnet structure, wherein the electromagnet structure attracts or repels the movable pressure plate.

9. The portable oxygen concentrator according to claim 2, wherein a throttle valve is provided between the molecular sieve tank and an oxygen storage tank.

10. The portable oxygen concentrator according to claim 2, wherein the valve group is a two-position two-way linked one-way pressure valve, the first single valve is a first-position valve of the two-position two-way linked one-way pressure valve and the second single valve is a second-position valve of the two-position two-way linked one-way pressure valve; and the first single valve and the second single valve are linked by a sliding vane.

11. The portable oxygen concentrator according to claim 2, further comprising an oxygen storage tank connected to the separation mechanism.

12. The portable oxygen concentrator according to claim 11, further comprising a humidifier connected to the oxygen storage tank, wherein an oxygen storage tank throttle valve is provided between the humidifier and the oxygen storage tank.

13. The portable oxygen concentrator according to claim 2, wherein the air bag is a folding air bag or an elastic air bag.

* * * * *